United States Patent
Lefavour et al.

(10) Patent No.: US 10,965,043 B2
(45) Date of Patent: Mar. 30, 2021

(54) SET SCREW CONNECTOR

(71) Applicant: Hubbell Incorporated, Shelton, CT (US)

(72) Inventors: John David Lefavour, Litchfield, NH (US); Thomas Romeo Faucher, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 270 days.

(21) Appl. No.: 16/141,448

(22) Filed: Sep. 25, 2018

(65) Prior Publication Data

US 2019/0115674 A1 Apr. 18, 2019

Related U.S. Application Data

(60) Provisional application No. 62/571,656, filed on Oct. 12, 2017.

(51) Int. Cl.
| | | |
|---|---|---|
| *B23P 19/00* | (2006.01) | |
| *H01R 9/18* | (2006.01) | |
| *F16B 35/00* | (2006.01) | |
| *H01R 4/36* | (2006.01) | |
| *F16B 39/26* | (2006.01) | |

(52) U.S. Cl.
CPC ............ *H01R 9/18* (2013.01); *F16B 35/005* (2013.01); *F16B 39/26* (2013.01); *H01R 4/36* (2013.01); *Y10T 29/53174* (2015.01)

(58) Field of Classification Search
USPC .... 29/857, 407.01, 428, 515, 516, 520, 825, 29/876, 739, 717, 718, 720, 747, 8, 57
See application file for complete search history.

(56) References Cited

U.S. PATENT DOCUMENTS

| | | |
|---|---|---|
| 1,225,084 A | 5/1917 | Von Sick |
| 2,938,069 A | 5/1960 | Toedtman et al. |
| 2,956,108 A | 10/1960 | Brenner |
| 3,015,084 A | 12/1961 | Gribble |
| 3,322,888 A | 5/1967 | Zemels |
| 3,354,517 A | 11/1967 | Levinsky |

(Continued)

OTHER PUBLICATIONS

YH292C Data Sheet Burndy Electrical (FCI USA Inc.), Dec. 28, 1990, Rev #9.*

(Continued)

*Primary Examiner* — Thiem D Phan
(74) *Attorney, Agent, or Firm* — Wissing Miller LLP

(57) ABSTRACT

A set screw for connecting conductors with electrical terminals, such as a terminal block of a load panel includes a screw body and a screw face. The screw face fits inside the screw body and is movable along the axis of the screw body. An elastically deformable member, such as a coil spring or set of spring washers is disposed between the screw body and the screw face. The elastically deformable member compresses in response to force exerted between the screw body and screw face. An indicator bar is connected with the screw face and moves along the axis of the screw body along with the screw face in response to the compressive force. The proximal end of the indicator bar extends proximal of the screw body and includes one or more indicia that show the deformation of the elastically deformable member.

17 Claims, 6 Drawing Sheets

(56) References Cited

U.S. PATENT DOCUMENTS

| | | |
|---|---|---|
| 3,746,777 A | 7/1973 | Peek |
| 3,775,733 A | 11/1973 | Ege |
| 3,781,459 A | 12/1973 | Peek |
| 3,876,279 A | 4/1975 | Underwood |
| 4,072,393 A * | 2/1978 | McDermott ............ H01R 4/363 439/811 |
| 4,350,843 A | 9/1982 | Campbell et al. |
| 5,036,164 A | 7/1991 | Schrader et al. |
| 5,102,347 A | 4/1992 | Cote et al. |
| 5,103,068 A | 4/1992 | Schrader |
| 5,162,615 A | 11/1992 | Schrader et al. |
| 5,200,576 A | 4/1993 | Schrader et al. |
| 5,368,506 A | 11/1994 | Heimbrock |
| 5,396,033 A | 3/1995 | Piriz et al. |
| 5,552,564 A | 9/1996 | Schrader et al. |
| 5,635,676 A | 6/1997 | Piriz |
| 5,855,460 A | 1/1999 | Brehmer et al. |
| 5,898,131 A | 4/1999 | Chadbourne et al. |
| 5,957,733 A | 9/1999 | Mello |
| 6,186,839 B1 | 2/2001 | Storey |
| 6,213,818 B1 | 4/2001 | Chadbourne |
| 6,261,137 B1 | 7/2001 | Wilcox |
| 6,338,658 B1 | 1/2002 | Sweeney |
| 6,497,592 B1 | 12/2002 | Beadle |
| 6,525,270 B1 | 2/2003 | Connor et al. |
| 6,538,204 B2 | 3/2003 | Connor |
| 6,939,183 B2 | 9/2005 | Ferretti |
| 7,511,224 B1 | 3/2009 | Kossak |
| 7,537,494 B1 | 5/2009 | Umlauf |
| 7,699,669 B2 * | 4/2010 | Sweeney ................ H01R 4/366 439/791 |
| 7,896,714 B2 | 3/2011 | Moist |
| 7,946,896 B2 | 5/2011 | Waltz |
| 8,277,263 B1 | 10/2012 | Smith |
| 10,122,096 B2 | 11/2018 | Rutland |
| 2003/0010524 A1 | 1/2003 | Connor |
| 2003/0124915 A1 | 7/2003 | Kaine |
| 2008/0268721 A1 | 10/2008 | Waltz |
| 2009/0053940 A1 | 2/2009 | Sweeney et al. |
| 2010/0087083 A1 | 4/2010 | Skowranek |
| 2011/0203424 A1 | 8/2011 | Riestra |
| 2014/0322994 A1 | 10/2014 | Keeven et al. |
| 2016/0028170 A1 | 1/2016 | Hyder |
| 2017/0104283 A1 | 4/2017 | Frank |
| 2018/0159248 A1 | 6/2018 | Ruland |

OTHER PUBLICATIONS

International Search Report and Written Opinion mailed in PCT/US17/63719 dated Feb. 5, 2019.

Preliminary Report on Patentability mailed in corresponding International Application PCT/US18/52654 dated Apr. 23, 2020.

* cited by examiner

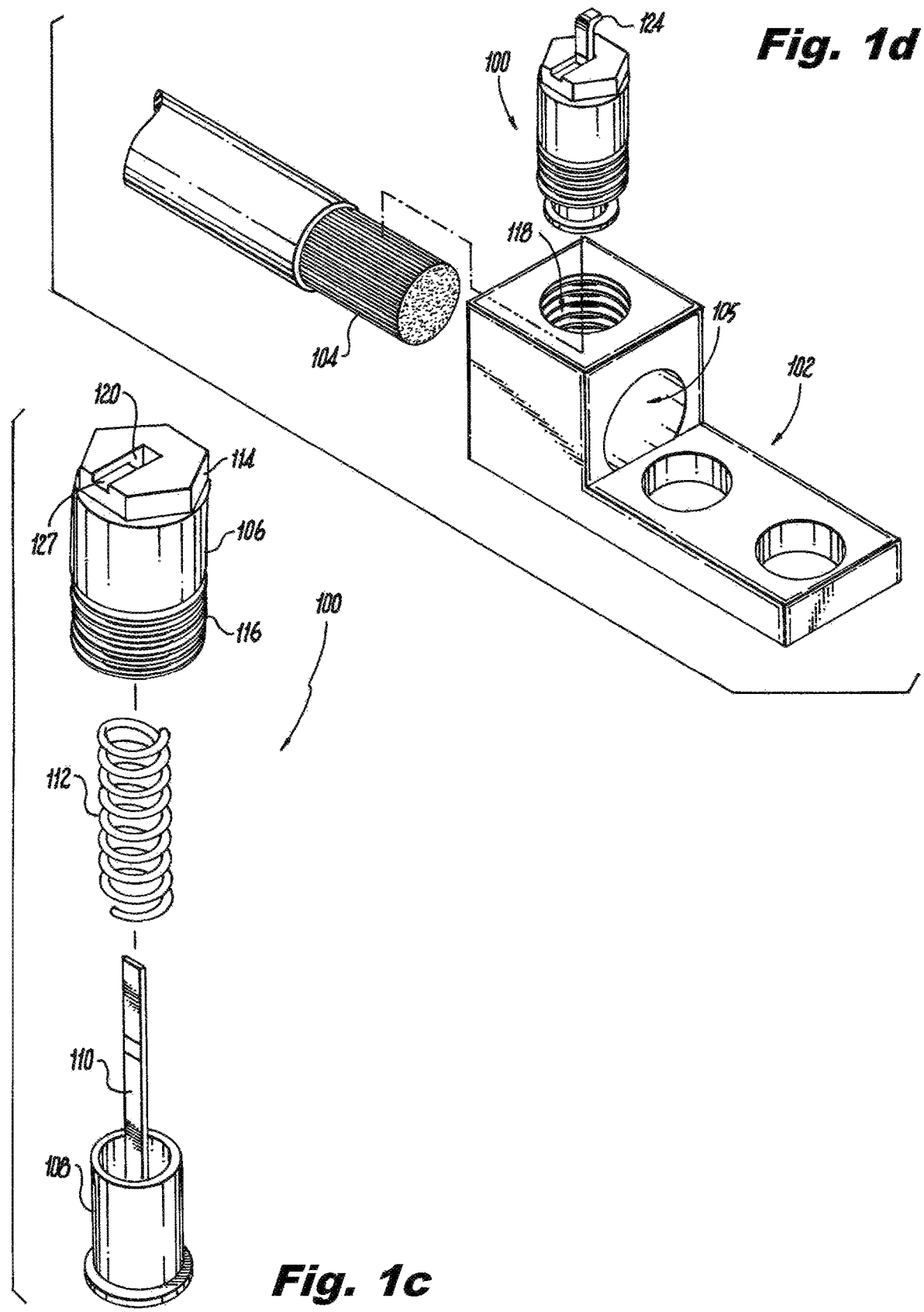

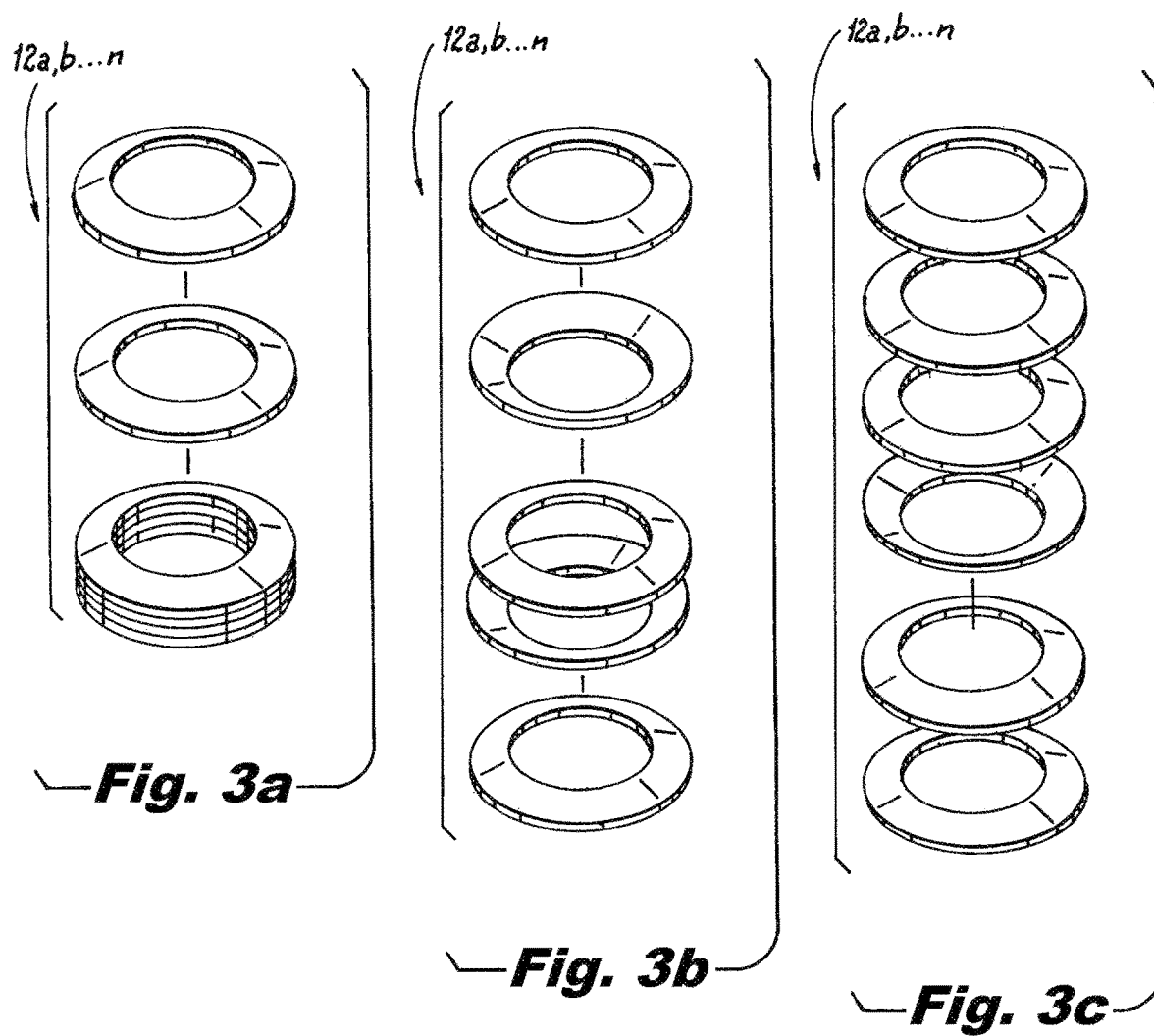

SET SCREW CONNECTOR

This application claims priority under 35 U.S.C. § 119 to U.S. Provisional Patent Application No. 62/571,656, filed on Oct. 12, 2017. The disclosure of that application is incorporated herein by reference.

BACKGROUND

Field

The present disclosure relates to set screws and methods for installing set screws. More particularly, the present disclosure relates to a set screw including a mechanism for providing a consistent force applied between the screw and an electrical conductor and an indicator showing the value of that force. The present disclosure also relates to methods for installing such screws and for inspecting equipment using such screws.

Description of the Related Art

Connections between electrical conductors and electrical equipment are typically made using set screws. For example, to connect wiring to a load panel an installer inserts the end of a wire conductor into a hole in a terminal block on the load panel and tightens a set screw threaded into another hole in the terminal block so that the screw presses against the wire. The force applied by the screw onto the conductor creates a strong mechanical connection between the conductor and the terminal block and provides a secure, low-resistance electrical connection between the wire and the panel.

The force applied by the set screw and the wire depends on the amount of torque the installer applies to the screw. If the installer wants to assure a consistent amount of force applied, the installer needs to use a torque measuring tool, such as a torque wrench, when tightening the set screw. Without using such a tool, the installer may apply varying amounts of torque to the set screw, thus creating connections between conductors and equipment that have varying mechanical strength and potentially varying electrical resistance. According to one study presented in the July 2010 issue of IAEI magazine, a journal published by the International Association of Electrical Inspectors, installers who did not use a torque measuring tool when installing set screw connections failed to tighten the screws to recommended torque values at least 75% of the time. For some applications, code or regulations may require a specified torque be applied to tighten set screws, necessitating the use of a torque wrench or similar tool.

One solution to providing consistent torque to set screws at the time they are installed without using a torque measuring tool it to provide a "break-away" set screw. A break-away screw includes a breakable connection between the portion of the screw engaged with a driving tool and the portion threaded into the terminal block. When the proper amount of torque is applied this connection breaks. Break-away screws may be relatively complicated to manufacture. Break-away set screws can only be installed once, which add cost if conductors need to be removed and then reconnected. Moreover, where different amounts of torque are recommended for different applications, screws designed to break off at different torques must be provided.

To maintain good electrical and mechanical connection between conductors and electrical equipment, the force between the set screw and the conductor must remain sufficiently high throughout the lifetime of the equipment. Force applied by a set screw may change over time. Conductors are typically formed from twisted strands of round wire. Over time the round wire strands may deform under the force applied by the set screw, filling in the interstitial spaces between the strands, reducing the effective thickness of the conductor in contact with the face of the set screw and thus reducing the force applied by the screw. In addition, temperature changes due to changes in ambient temperature and to resistive heating of the equipment itself may cause the dimensions of the conductor, terminal block and/or the set screw to vary over time. This may also cause the force applied by the screw to vary. Thus, even when an installer uses a torque wrench or a break-away screw to assure that torque applied to the screw, and hence force applied by the screw to the conductor is sufficient at the time of installation, this does not assure that force on conductors remains sufficient for the lifetime of the equipment.

To be sure that a set screw continues to apply sufficient force, torque can be measured periodically using a torque wrench. In such situations, an inspector uses a torque wrench or similar tool to test the torque applied to the screw. This may require powering down the equipment. Moreover, inspection of many screws may be time consuming. Where connections are made in confined spaces, using a torque wrench may also be cumbersome.

A further problem with known set screws is that the amount of torque applied to the screw may not correlate with the expected force the screw applies to the conductor. Friction between the threads of the screw and the terminal block must be overcome to drive the screw into the terminal block. Some torque applied overcomes this friction but does not contribute to the force applied to the conductor. Moreover, friction between the threads of the screw and the terminal block is different when the screw is stationary as compared to when the screw is rotating. Sticking friction between the screw and the terminal block is generally higher than sliding friction between those surfaces. Thus, when an installer or inspector uses a torque wrench to check the torque applied to a screw that is stationary in the terminal block, the torque reading may not accurately reflect the amount of force being applied between the face of the set screw and the conductor. This problem may be exacerbated by corrosion or differential thermal expansion between the screw and the terminal block that may increase sticking friction between the screw and the terminal block.

SUMMARY

The present disclosure relates to apparatuses and methods to address these difficulties.

According to one embodiment, there is provided a set screw comprising a screw body and a screw face with the screw face movable along an axial direction of the screw body, and an elastically deformable member disposed between the screw body and the screw face. The elastically deformable member is adapted to compress in response to force applied to the screw face along the axial direction relative to the screw body.

According to another embodiment, the set screw includes an indicator bar movable along the axial direction with respect to the screw body and connected with the screw face at a distal end, wherein a proximal end of the indicator bar includes one or more indicia. The indicia indicate an amount of compression of the elastically deformable member along the axial direction. According to an aspect of the disclosure, the indicator bar extends along the axis of the screw body and extends beyond a proximal end of the screw body. According to this aspect, the indicia are fiducial marks on the indicator bar near the proximal end of the indicator bar that are visible near the proximal end of the screw body. According to another aspect of the disclosure the indicia are detectable remotely, such as by a radio frequency communication. According to another aspect of the disclosure, the indicia are calibrated so that a first force applied between the screw face and the screw body cause the indicia to indicate a first value. That first force may be between 10 and 4000 pounds. According to a still further aspect, instead of indicating a force, the indicia are calibrated to indicate an equivalent torque applied to the screw.

According to another aspect of the disclosure, the set screw comprises a threaded portion on the outer surface of the screw body, the threaded portion adapted to engage with a threaded bore of a terminal block. According to another aspect of the disclosure, the set screw further comprises a tool engagement, the tool engagement adapted to connect with a tool for rotating the set screw body with respect to the terminal block. According to another aspect of the disclosure, the tool engagement comprises a tool engaging surface connected with the screw body by a break-away structure, wherein the break-away structure releases the tool engagement from the screw body when a predetermined torque is applied.

According to another aspect, the screw body includes a capture opening at the proximal end of the screw body. The indicator bar passes through the capture opening. An expanded region larger than the capture opening is then formed on the proximal portion of the bar securing the indicator bar, screw face, elastic deformable member and screw body together.

According to a further embodiment, the elastically deformable member is a coil spring. According to another embodiment the elastically deformable member is one or more disc springs and the disc springs are arranged in a parallel stack, in a series stack, or in a combination of a parallel stack and series stack.

According to another embodiment of the disclosure a method of connecting a conductor to a terminal block is provided. According to this method, aset screw is provided. The set screw includes i) a screw body, the screw body having screw threads on its outer surface and a tool engagement, ii) a screw face, the screw face movable along an axial direction of the screw body, iii) an elastically deformable member disposed between the screw body and the screw face, the elastically deformable member adapted to compress in response to force applied to the screw face along the axial direction relative to the screw body, and iv) an indicator bar movable along the axial direction with respect to the screw body and connected with the screw face at a distal end, wherein a proximal end of the indicator bar includes one or more indicia, wherein the indicia indicate an amount of compression of the elastically deformable member along the axial direction, the amount of compression being dependent on a force applied between the screw body and the screw face. The terminal block has an opening to insert the conductor and a set screw hole in communication with the opening. The set screw hole has internal threads adapted to engage with the screw threads on the screw body so that rotation of the set screw with respect to the terminal block drives the set screw toward the conductor. The method includes threading the set screw into the set screw hole so that the screw face contacts the conductor and rotating the set screw until the indicia indicate a compression that corresponds to a desired force applied by the screw face onto the conductor. The method may further include inspecting the indicia at a later time to determine that the compression continues to correspond to the desired force.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1a shows a perspective view of a conductor and a terminal block in conjunction with a set screw according to an embodiment of the disclosure;

FIG. 1b shows a cross section of the conductor, terminal block, and set screw shown in FIG. 1a;

FIG. 1c shows an exploded perspective view of a set screw according to an embodiment of the disclosure;

FIG. 1d shows a perspective view of a conductor, a terminal block, and a set screw being assembled according to an embodiment of the disclosure;

FIG. 2b shows a cross section of the conductor, terminal block, and set screw shown in FIG. 2a;

FIGS. 3a-c show perspective views of arrangements of spring washers used in conjunction with embodiments of the disclosure;

FIG. 5b shows a cross section of the conductor, terminal block, and set screw shown in FIG. 5a.

DETAILED DESCRIPTION

Figures 1A, 1B:
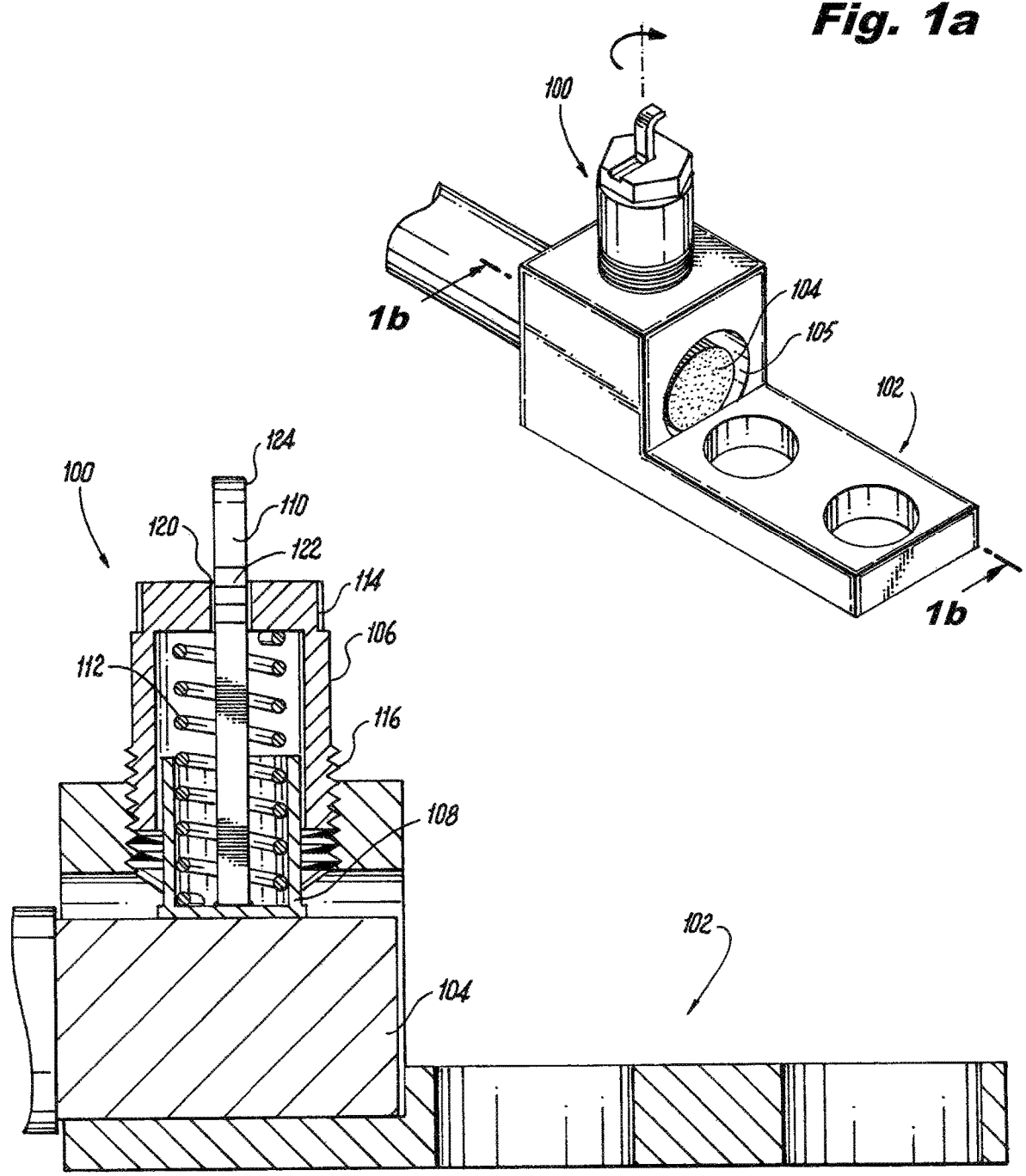

FIG. 1a shows set screw 100 according to an embodiment of the present disclosure engaged with a terminal block 102. A conductor 104 is inserted into an opening 105 of the terminal block. Terminal block 102 may provide electrical connection to electrical equipment such as a load panel, circuit breaker, bus bar, or the like. Set screw 100 extends through the top of the terminal block 102 and contacts the conductor 104 to provide a mechanical and electrical connection between the conductor 104 and the block 102.

FIG. 1b shows a cross section of the set screw 100, terminal block 102 and conductor 104. FIG. 1c shows a cross section exploded view of the set screw 100 alone. FIG. 1d shows terminal block 102, screw 100 and conductor 104 prior to connecting the conductor with the block.

The set screw 100 is composed of a screw body 106, a screw face 108, an indicator bar 110, and an elastic member 112. The screw body 106 has a tool engagement surface 114 at its proximal end and screw threads 116 on its outer surface at its distal end. The tool engagement surface is shaped to engage with a tool, such as a wrench, screwdriver, or the like that an installer uses to apply torque to rotate the screw 100. Threads 116 on the outer surface of screw body 106 are adapted to engage with a threaded hole 118 on the terminal block 102 (as shown in FIG. 1d) so that rotation of the screw 100 moves the screw body 106 into and out of the terminal block 102. Screw body 106 has an inner cavity shaped to accommodate portions of screw face 108, indicator bar 110 and elastic member 112. As shown in the exploded view of FIG. 1c, screw body 106 has an opening 120 at its proximal end. As shown in FIGS. 1a and 1b, the proximal end of indicator bar 110 extends through hole 120.

Screw face 108 fits within the screw body 106 and can move axially with respect to the screw body. According to one embodiment, screw face 106 is cup-shaped with an internal cavity shaped to hold the distal end of elastic member 112. The distal surface of screw face 108 is adapted to apply force to conductor 104. Sides of the cup-shaped screw face 108 fit within the inner cavity of screw body 106. According to one embodiment, the sides of screw face 108 slide along the inner surface of screw body 106 to constrain screw face 106 to move substantially in the axial direction. Indicator bar 110 is connected at its distal end to screw face 108 and extends along the central axis of the screw body 106. The proximal end of the indicator bar 110 extends through a hole 120 at the proximal end of the screw body 106. Elastic member 112 is disposed within the screw body 106. According to one embodiment, the elastic member 112 is a coil spring that encircles indicator bar 110. The spring 112 engages with the proximal surface of the screw face 108 and the distal surface of the interior of the screw body 106. According to one embodiment, the cup-shaped cavity formed by screw face 108 holds the distal end of coil spring 112.

Indicator bar 110 includes one or more indicia 122 near its proximal end. The indicia 122 are positioned near the point where the indicator bar 110 exits the hole 120 at the proximal end of the screw body 106. According to one embodiment, the indicia are read by comparing the position of the indicia with the edge of hole 120. According to another embodiment, a notch or window 127 is provided on the proximal surface of screw body 106 and the indicia are positioned so that they can be viewed along the notch or window. The indicator bar 110 has a bent or expanded region 124 at its proximal end. The bent or expanded region 124 is shaped so that it cannot fit through hole 120. As a result, when screw 100 is assembled as shown in FIGS. 1a and 1b, the screw body 106, screw face 108 and spring 112 are permanently connected to one another. As shown in FIG. 1b, screw face 108 and indicator bar 110 can move axially with respect to screw body 106. Spring 112 provides a force that presses screw face 108 distally.

Use of a screw 100 according to an embodiment of the disclosure is as follows. As shown in FIG. 1d, conductor 104 is inserted into hole 105 of terminal block 102. Screw 100 is screwed into terminal block 102 until screw face 108 contacts conductor 104, as shown in FIG. 1b. The installer continues to rotate the screw body 106, driving the distal inner surface of screw body 106 against spring 112. Spring 112 presses against the proximal inner surface of screw face 108. Spring 112 is compressed between the distal inner surface of screw body 106 and the proximal inner surface of screw face 108 driving screw face 108 toward conductor 104. As spring 112 compresses, screw face 108 moves toward screw body 106, pushing indicator bar 110 in the proximal direction outward through hole 120. According to one embodiment, the force exerted by screw face 108 onto conductor 104 increases in proportion to the displacement of the screw face indicated by the indicia in relation to the edge of hole 120 or in relation to the notch or window 127. According to another embodiment, the indicia are calibrated to show the force being applied by the screw face 108 onto the conductor 104. According to another embodiment, the indicia are calibrated to show an equivalent of the torque applied to the screw body 106.

When the indicia show that the force or equivalent torque is at a desired amount, the installer stops turning the screw 100. Because the spring 112 remains compressed, it continues to press on the screw face 108 against conductor 104, assuring that a secure mechanical and electrical connection is maintained between the conductor 104 and the terminal block 102. Should conductor 104 compress, for example, because individual strands of the conductor deform, or should the dimensions of the conductor, terminal block or screw 100 change, for example, because of thermal expansion, spring 112 will continue to apply force, keeping the mechanical and electrical connection secure. In addition, should dimensional changes of the conductor or terminal block allow the spring to expand and thus reduce the force exerted on conductor 104 by screw face 108, indicator bar 110 will move in the distal direction. This movement will change the position of indicia 122 relative to the edge of hole 120 or notch 127. The position of the indicia will show this reduction in force. Thus, the force exerted on conductor 104 can be assessed by visual inspection. A torque wrench may not be needed to be used to test whether torque is applied when screw 100 is installed. In addition, because force on the conductor can be determined by visual inspection, electrical power may not need to be removed from equipment in order to inspect whether conductors are securely connected.

According to a further embodiment, set screw 100 is in the form of a one-way fastener. According to this embodiment, instead of providing screw threads on the outer surface of screw body 106 and on the inner surface of the terminal block hole, a plurality of ridges are provided on the outer surface of screw body 106. The ridges cooperate with one or more grooves on the inner surface of the hole in the terminal block. The ridges are adapted to allow one-way insertion of the set screw 100 into the hole. The ridges have a ramped surface on a distal side that extends at an oblique angle from the screw body 106, and a straight surface on a proximal side that extends substantially perpendicular from the surface of the screw body 106. The ridges have sufficient elasticity so that when they encounter the grooves while moving in the distal direction, they flex in response to the ramped surface sliding along the edge of the groove. This allows the screw body 106 to move in the distal direction into the hole. The straight surface of the ridges does not ride up on the groove edge and prevents screw body 106 from moving in the proximal direction.

In operation, set screw 100 is pressed into the hole in the terminal block, as shown in FIG. 1d. Ridges deform to allow set screw 100 to move into the hole. Screw face 108 applies force on conductor 104. As force is applied to screw body 106 spring 112 is compressed between the distal inner surface of screw body 106 and the proximal inner surface of screw face 108 driving screw face 108 against conductor 104. Screw face 108 moves toward screw body 106 compressing spring 112 and pushing indicator bar 110 in the proximal direction outward through hole 120. Engagement of the ridges and grooves prevents the screw body 106 from moving proximally, locking set screw 100 into the hole, with the force being exerted by screw face 108 onto the conductor 105 shown by the indicia.

A method of assembling screw 100 according to an embodiment of the disclosure is described as follows. Screw face 108 is connected with indicator bar 110. Screw face 108 and indicator bar 110 may be formed separately and joined, for example, by welding. Alternatively, screw face 108 and indicator bar 110 may be formed as a unitary body, for example, by stamping, forging, or die cast molding. Initially, indicator bar 110 has no bent or expanded portion 124. As shown in FIG. 1c, spring 112 is fitted over indicator bar 110. Indicator bar 110 and spring 112 are fitted into the hollow interior of screw body 106. The proximal end of indicator bar 110 is fitted through hole 120 so that it extends out of the proximal end of screw body 106. Bent or expanded portion 124 is formed on the proximal portion of indicator bar 110. This prevents the indicator bar 110, spring 112, and screw face 108 from separating from screw body 106.

According to one embodiment, indicia are formed on indicator bar 110 during a calibration procedure as follows. Screw 100 is assembled as described above. The screw is place in a press adapted to exert force between the distal end of screw face 108 and screw body 106. The press applies a predetermined amount force that is somewhat greater than the desired force on a conductor when the screw is installed. Indicia 122 are applied to indicator bar 110 a predetermined distance above the edge of hole 120 (or above the notch 127), for example, by stamping, applying an adhesive label, or by painting. The predetermined distance is selected based on the spring constant of spring 112 so that when the indicia is adjacent to the edge of hole 120 or notch 127, the force will be equal to the desired force to be applied to a conductor when screw 100 is installed. According to another embodiment, the press applies a number of different forces to screw 100 and a respective number of indicia are applied for each different applied force. According to another embodiment, rather than using a press to apply force and then applying indicia, known mechanical characteristics of the spring, (e.g., its spring constant) and dimensions of the screw body, screw face, and indicator bar are used to determine locations for indicia on the indicator bar that calibrate displacement with force or torque. According to a further embodiment, indicia may be calibrated to show a maximum and minimum recommended force or torque to provide a secure connection between the conductor and the terminal block.

Figure 2A:
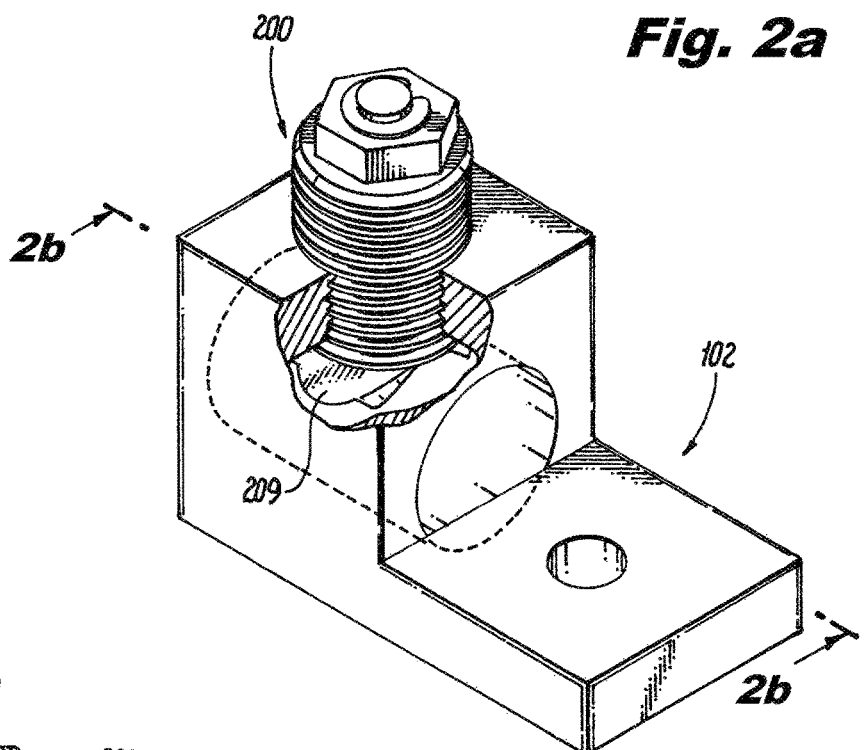
FIG. 2a shows a partial cut-away view of a conductor and a terminal block in conjunction with a set screw according to another embodiment of the disclosure.
Figure 2B:
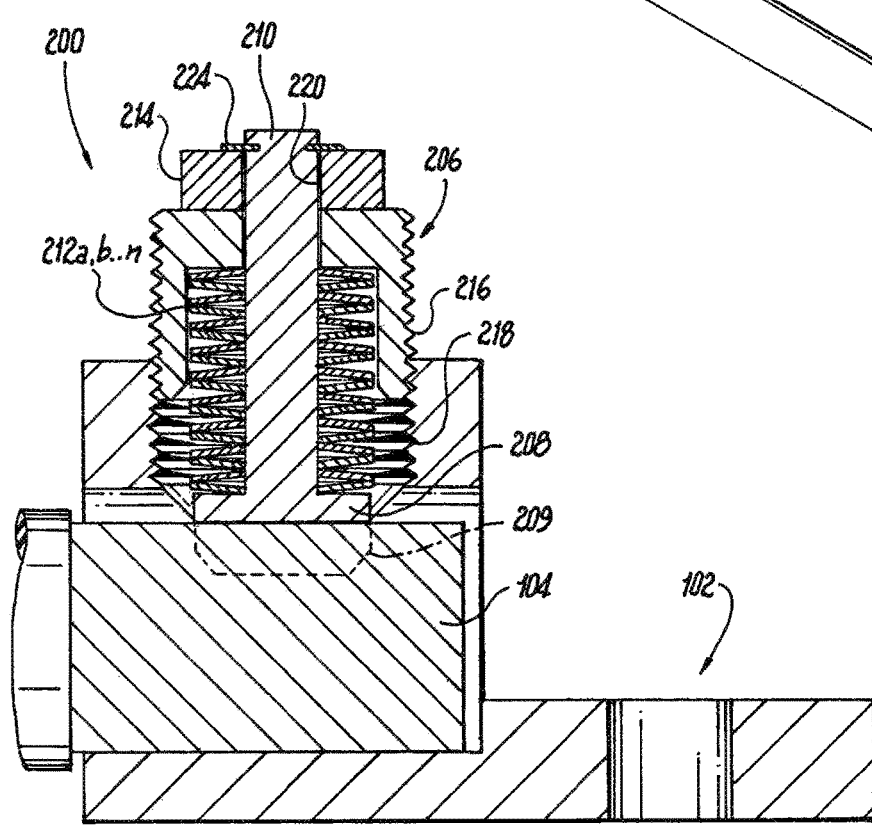

FIGS. 2a and 2b show another embodiment of set screw 200 according to the disclosure. Terminal block 102 is the same or is similar to terminal block 102, described with respect to the previous embodiment. Screw 200 is comprised of screw body 206, screw face 208, bar 210 and spring washers 212a, b, . . . n. Screw body 206 has a hollow inner cavity and a tool engagement surface 214 near its proximal end. Tool engaging surface 214 is shaped to connect with a wrench, screw driver or other tool for rotating the screw and applying torque. Threads 216 on the outer surface of screw body 206 engage a threaded hole 218 in terminal block 102 in a manner similar to the previous embodiments.

Screw face 208 is positioned distal of the edge of screw body 206 and is connected with bar 210. Bar 210 extends along the axis of screw body 206 and through hole 220 at the proximal end of screw body 206. E-ring 224 is engaged with a groove near the proximal end of bar 210 proximal of where bar 210 passes through hole 220. E-ring 224 prevents bar 210 from being drawn distally through the hole at the proximal end of screw body 206.

The plurality of disc springs (also known as Belleville washers) 212a, b, . . . n encircle bar 210. The proximal-most washer contacts the inside distal surface of screw body 206 and the distal-most washer contacts the proximal surface of screw face 208. According to one embodiment, when screw 200 is not engaged with a conductor in terminal block 102, washers 212 a, b, . . . n are somewhat compressed so that e-ring 224 is held against the proximal face of screw body 206.

According to one embodiment, a conductor contacting block 209 is connected with the distal surface of screw face 208. Block 209 may have a partial cylindrical shape to conform to the surface of a round conductor. According to another embodiment, rather than a block 209, the distal surface of the screw face 208 itself is formed into a conductor engaging shape. According to a further embodiment, block 209 or the distal surface of screw face 208 include ridges, grooves, teeth, or other features that facilitate securely engaging with a conductor.

When screw 200 is threaded into terminal block 102 and screw face 208 contacts a conductor, screw body 206 compresses spring washers 212 a, b, . . . n against the screw face 208 in a manner similar to the spring 112 described with regard to previous embodiments.

According to one embodiment, screw 200 is installed in terminal block 102 in contact with conductor 104. Screw 200 is torqued sufficiently so that e-ring 224 is displaced away from the proximal surface of screw body 206. The displacement of the e-ring indicates how much compression force is experienced by spring washers 212 a, b, . . . n. A feeler gauge (not shown) may be used to determine how much compression has been applied to spring washers 212 a, b, . . . n. Based on the spring constant of the washers, this displacement is used to determine how much force is exerted on conductor 104 or equivalently, how much torque is being applied on the screw. The installer may use a feeler gauge at the time screw 200 is installed to assure the applied force is adequate. In addition, when screw 200 is later inspected to assure that force on conductor 104 remains sufficient, an inspector can likewise use a feeler gauge to confirm that e-ring 224 remains displaced from screw body 206 by an amount that indicates sufficient force is being applied to the conductor. Alternatively, indicia may be applied to bar 210 in a manner similar to that described with respect to other embodiments.

Spring washers 212 a, b, . . . n are cone-shaped metal discs with defined mechanical properties. When force is applied along their axis, disk springs compress with a well characterized spring constant. Spring force and deflection distance can be tailored by selecting whether the spring washers are in parallel or in series, that is, whether adjacent spring washers face one another convex-side-to-convex-side or convex-side-to-concave-side. FIGS. 3a, b, and c show examples of parallel, series, and combination parallel and series configurations, respectively, for spring washers. According to one embodiment, the mechanical characteristics of washers 212 a, b, . . . n, as well as the number of washers and their parallel/series arrangement is selected to exert the required force to maintain a secure mechanical and electrical connection between the conductor 104 and terminal block 102 and to cause a displacement of bar 210 that provides an easily measurable indication of the applied force. According to this embodiment, the applied force on a conductor and the displacement of bar 210 do not need to be calibrated using a press. In addition, the parallel-series arrangement of washers 212 a, b, . . . n are selected to have a spring constant that provides adequate force to maintain a reliable connection even when there is a small displacement caused by the conductor compressing over time.

Spring washers may provide greater spring force with shorter displacement distance as compared with coil springs. Thus, for applications where a high force must be applied to a conductor, such as for industrial equipment and electric power delivery, an embodiment of screw 200 including spring washers may be more desirable than screw 100 using a coil spring. For example, set screws 200 could be formed with dimensions suitable for use with power transmission cables. On the other hand, for applications where smaller forces need to be applied, for example, for connections to electronic appliances like audio and video equipment, an embodiment like screw 100 with a coil spring may be more desirable. According to a further embodiment, instead of a coil spring or spring washers, other means for providing a force to screw face 208 may be used, such as wave washers or an elastomeric material disposed between the screw body 206 and screw face 208. According to one embodiment, spring washers, a coil spring, or other mean of providing force to the screw face is selected to provide between 10 and 4000 pounds of force on a conductor when the screw is installed in a terminal block. According to one preferred embodiment, an arrangement of spring washer provides 2500 pounds of force when the screw is installed in a terminal block.

Figure 4:
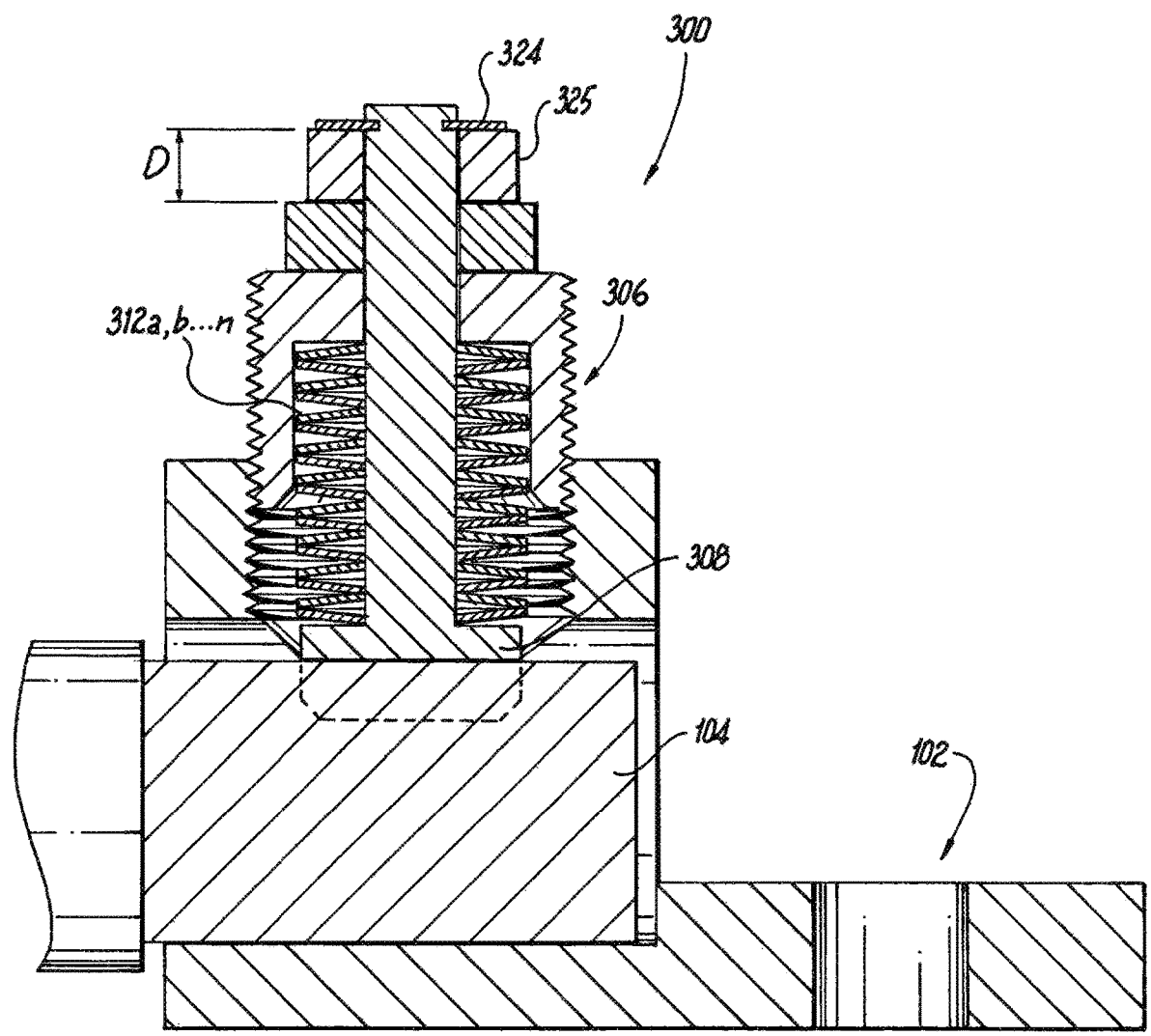
FIG. 4 shows a cross section of a conductor and a terminal block in conjunction with a set screw according to a further embodiment of the disclosure.

FIG. 4 shows a screw 300 according to another embodiment of the disclosure. Screw 300 is shown installed in a terminal block 102 and in contact with conductor 104, in a manner similar to that described with respect to other embodiments. Spring washers 312a, b, . . . n are disposed between screw body 306 and screw face 308 in a manner similar to the embodiments of FIGS. 2a and 2b. Torque has been applied to screw 300 so that e-ring 324 on bar 310 is displaced a distance D away from the proximal surface of screw body 306. Disposed between E-ring 324 and screw body 306 is a force sensing member 325. According to one embodiment, force sensing member 325 is installed between e-ring 324 and the proximal face of screw body 306 after screw 300 is installed with a required amount of torque. According to another embodiment, pressure sensing member 325 is connected with e-ring 324 and/or bar 310 and screw body 306 before screw 300 is installed in terminal block 102.

According to one embodiment, pressure sensing member 325 is a breakable container filled with an easily visible material such as fluorescent paint. The container is installed between e-ring 324 and screw body 306 after the screw is installed and torqued to exert the required force. If dimensional changes to the conductor, terminal block, or components of screw 300 were to change, such that the force exerted by screw face 308 on the conductor were reduced below a predetermined amount, springs 312 a, b, . . . n would expand, drawing e-ring 324 against pressure sensing member 325, breaking pressure sensing member 325 to release the visible material. In this manner, an inspector can quick examine a number of connections made using screws 300 to confirm that no paint has been released and thus that all the set screws continue to apply an adequate force on their respective conductors. Because release of fluorescent paint can be seen over a large number of individual connections and from a long distance, screws 300 may be useful where a large number of connections need to be inspected or where connections are located in a dangerous or difficult to access space, such as an underground electrical vault.

According to another embodiment, pressure sensing member 325 consists of a load cell or strain gauge connected with circuitry that can be accessed remotely, using, for example, radio frequency identification (RFID) technology. A signal from the load cell can be used to determine whether screw 300 continues to exert sufficient force on its respective conductor. Such an arrangement would allow an inspector to inspect connections in dangerous or difficult to access areas.

Figure 5A:
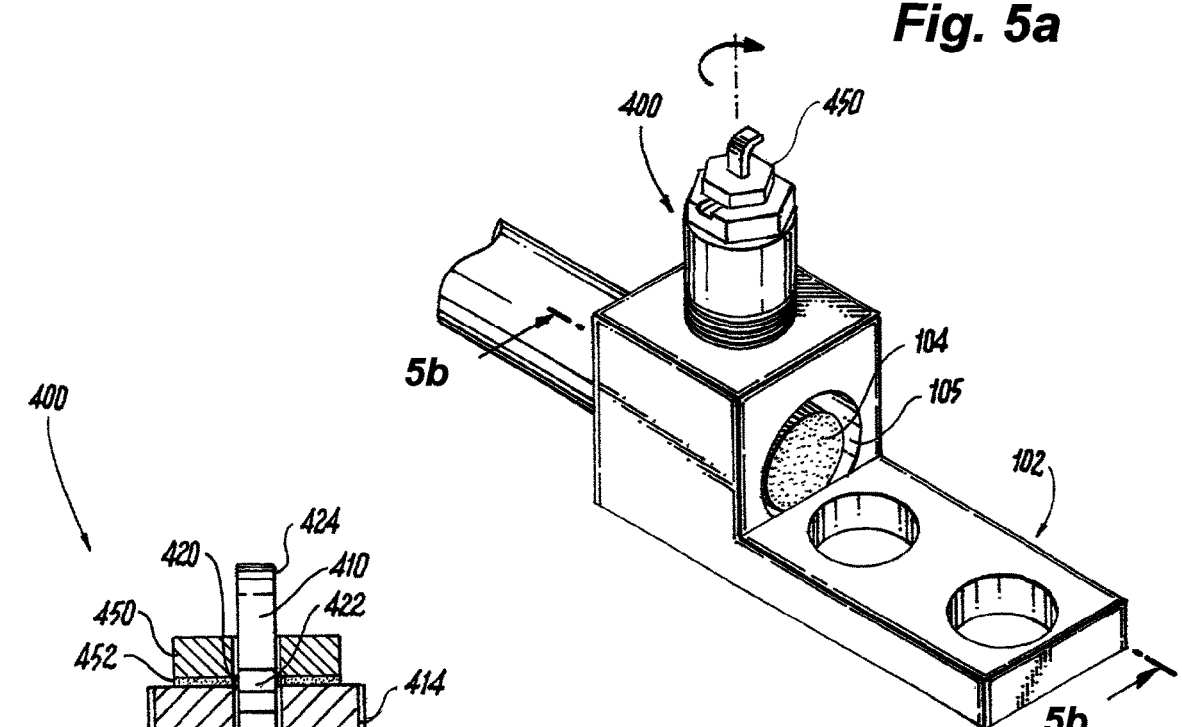
FIG. 5a shows a perspective view of a conductor and a terminal block in conjunction with a set screw according to another embodiment of the disclosure.
Figure 5B:
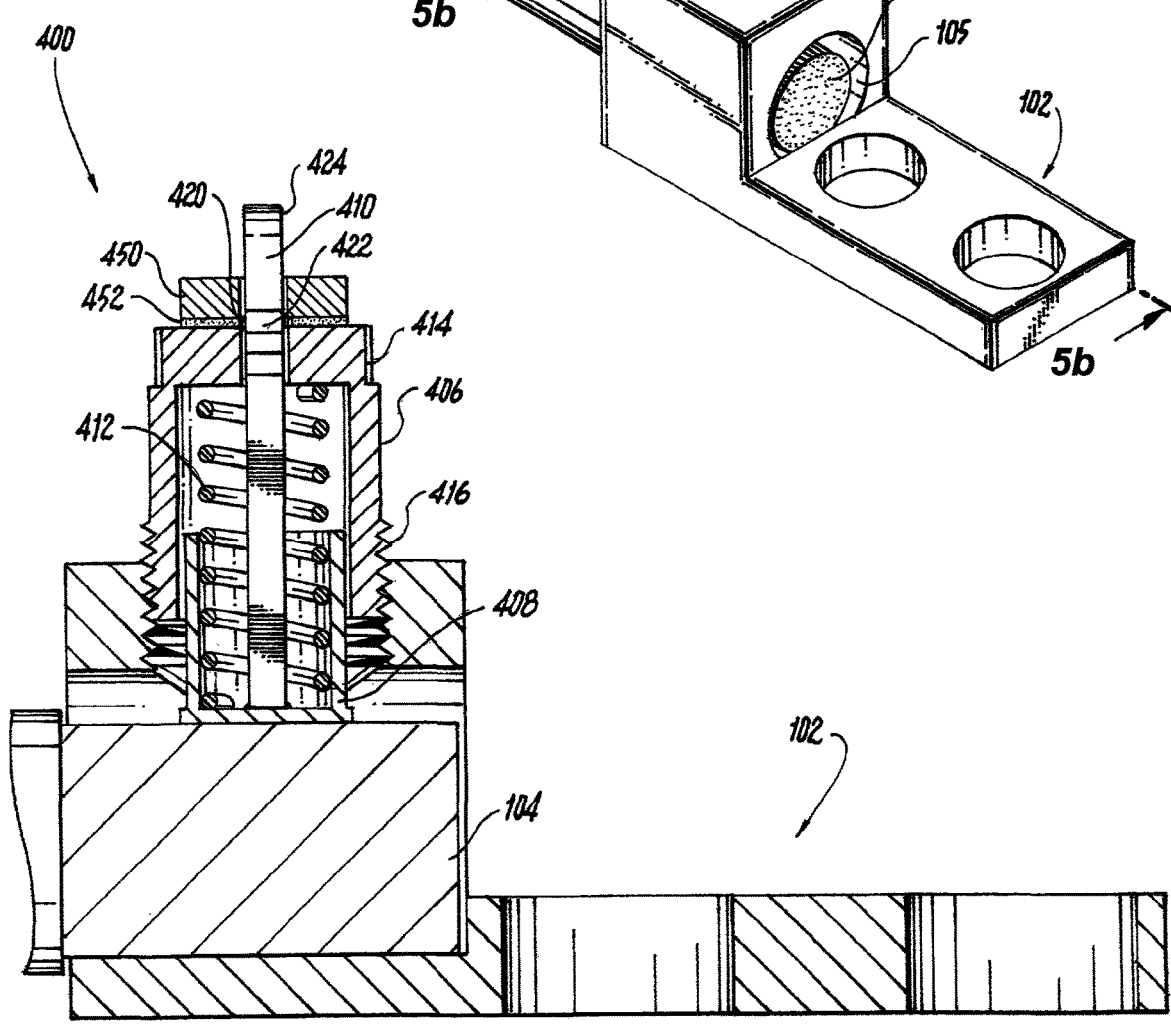

FIGS. 5a and 5b illustrate a further embodiment of the disclosure. Set screw 400 is formed in a manner similar to screw 100 described above with reference to FIGS. 1a-1d. Screw face 408 is connected with indicator bar 410. Screw body 406 includes a hollow portion with a spring or other force applying mechanism 412 disposed in the hollow portion between the proximal interior surface of screw face 408 and the interior distal surface of screw body 406.

In this embodiment, two tool engaging surfaces are provided. As with the previous embodiments, tool engaging surface 414 is connected directly with screw body 406. In addition, break-away nut 450 is connected with the proximal surface of screw body 406. Break-away nut 450 is connected with the screw body 406 in a manner that causes it to break away from the screw body when torque above a predetermined amount is applied. According to one aspect of the embodiment, break-away nut 450 and screw body 406 are formed as a unitary structure, for example, by forging or casting, and provided with a notched area between them that is designed to sheer off when the predetermined amount of torque is applied. According to another aspect, break-away nut 450 is connected with the proximal end of screw body 406 by a frangible material 452, for example, a layer of adhesive, that is designed to sheer when the predetermined amount of torque is applied.

As shown in FIG. 5a, set screw 400 is threaded into terminal block 102 to connect conductor 104 with the terminal block. An installer applies torque to break-away nut 450 to rotate the screw and drive it against the conductor 104. As increasing pressure is applied by screw face 408 against conductor 104, indicator bar 410 is forced in the proximal direction as in the previous embodiments. Once the applied torque exceeds the sheer strength of layer 452, or exceeds the breaking strength of the notched region between the break-away nut 450 and screw body 406, break-away nut 450 snaps away from screw body 406. This assures the installer that the proper amount of torque was applied without the need to use a torque wrench or other torque measuring tool. The installer can confirm that the proper force required for a secure connection is being applied to the conductor 104 by inspecting the indicia on indicator bar 410. The indicator bar continues to provide an indication of the force applied so that an inspector can later confirm that the connection is secure. If additional force needs to be applied, the installer, or maintenance person can apply torque to tool engaging surface 414 until the proper amount of force is shown by indicator bar 410.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. A set screw comprising:
a screw body;
a screw face, the screw face movable along an axial direction of the screw body;
an elastically deformable member disposed between the screw body and the screw face, the elastically deformable member adapted to compress in response to force applied to screw face along the axial direction relative to the screw body; and
an indicator bar movable along the axial direction with respect to the screw body and connected with the screw face at a distal end, wherein a proximal end of the indicator bar includes one or more indicia.

2. The set screw of claim 1, wherein the indicia indicate an amount of compression of the elastically deformable member along the axial direction.

3. The set screw of claim 1, further comprising a threaded portion on the outer surface of the screw body, the threaded portion adapted to engage with a threaded bore of a terminal block.

4. The set screw of claim 3, further comprising a tool engagement, the tool engagement adapted to connect with a tool for rotating the set screw body with respect to the terminal block.

5. The set screw of claim 4, wherein the tool engagement comprises a tool engaging surface connected with the screw body by a break-away structure, wherein the break-away structure releases the tool engagement surface from the screw body when a predetermined torque is applied.

6. The set screw of claim 4, wherein the indicia indicate an amount torque applied by the tool to the screw body relative to the terminal block.

7. The set screw of claim 1, wherein the indicator bar extends along the axis of the screw body and extends beyond a proximal end of the screw body.

8. The set screw of claim 7, wherein the indicia are fiducial marks on the indicator bar near the proximal end of the indicator bar.

9. The set screw of claim 1, wherein the indicia are calibrated so that a first force applied between the screw face and the screw body cause the indicia to indicate a first value.

10. The set screw of claim 9, wherein the indicia are visible.

11. The set screw of claim 9, wherein the indicia are detectable remotely.

12. The set screw of claim 11, wherein the indicia are detectable by a radio frequency communication.

13. The set screw of claim 9, wherein the first force is between 10 and 4000 pounds.

14. The set screw of claim 1, wherein the elastically deformable member is a coil spring.

15. The set screw of claim 1, wherein the elastically deformable member is one or more disc springs.

16. The set screw of claim 15, wherein the elastically deformable member is a plurality of disc springs and wherein the disc springs are arranged in a parallel stack, in a series stack, or in a combination of a parallel stack and series stack.

17. The set screw of claim 1, further comprising a capture opening at the proximal end of the screw body, wherein the indicator bar passes through the opening and wherein the indicator bar includes an expanded portion proximal of the capture opening, wherein the expanded portion cannot fit through the capture opening.

* * * * *